(12) United States Patent
Lin et al.

(10) Patent No.: US 12,185,387 B2
(45) Date of Patent: Dec. 31, 2024

(54) RANDOM ACCESS PROBLEM REPORTING METHOD, TERMINAL DEVICE AND STORAGE MEDIUM

(71) Applicant: GUANGDONG OPPO MOBILE TELECOMMUNICATIONS CORP., LTD., Dongguan (CN)

(72) Inventors: Xue Lin, Dongguan (CN); Xin You, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 275 days.

(21) Appl. No.: 17/668,743

(22) Filed: Feb. 10, 2022

(65) Prior Publication Data

US 2022/0167434 A1 May 26, 2022

Related U.S. Application Data

(63) Continuation of application No. PCT/CN2019/119003, filed on Nov. 15, 2019.

(51) Int. Cl.
*H04W 74/0833* (2024.01)
*H04W 72/044* (2023.01)
*H04W 74/08* (2024.01)

(52) U.S. Cl.
CPC ..... *H04W 74/0841* (2013.01); *H04W 72/044* (2013.01); *H04W 74/0866* (2013.01)

(58) Field of Classification Search
CPC ........... H04W 72/044; H04W 74/0833; H04W 74/0841; H04W 74/0866
See application file for complete search history.

(56) References Cited

U.S. PATENT DOCUMENTS

| | | | | |
|---|---|---|---|---|
| 2019/0230562 A1 | 7/2019 | Fan et al. | | |
| 2020/0314913 A1* | 10/2020 | Rastegardoost | ...... | H04L 5/0091 |
| 2020/0404711 A1* | 12/2020 | Zhao | ...... | H04W 80/02 |
| 2021/0105828 A1* | 4/2021 | Agiwal | ...... | H04L 5/0051 |

(Continued)

FOREIGN PATENT DOCUMENTS

| | | | |
|---|---|---|---|
| CN | 108271275 A | 7/2018 | |
| CN | 108282834 A | 7/2018 | |

(Continued)

OTHER PUBLICATIONS

Extended European Search Report issued in corresponding European application No. 19952625.2, mailed Jun. 17, 2022.

(Continued)

*Primary Examiner* — Kashif Siddiqui
(74) *Attorney, Agent, or Firm* — BAYES PLLC (57) ABSTRACT

Disclosed is a random access problem reporting method, comprising: a terminal device determining a random access attempt threshold value according to a random access type supported by an uplink bandwidth part; and when the terminal device fails in random access, the terminal device determining, according to the relationship between the number of instances of sending a random access request and the random access attempt threshold value, whether to report a random access problem. Further disclosed are a terminal device and a storage medium.

16 Claims, 5 Drawing Sheets determining, by a terminal device, a random access attempt threshold according to a random access type supported by an uplink bandwidth part — S601 determining, by the terminal device, whether to report a random access problem, according to a relationship between the number of random access request transmissions and the random access attempt threshold, in response to a random access failure of the terminal device — S602

(56) References Cited

U.S. PATENT DOCUMENTS

| | | | |
|---|---|---|---|
| 2021/0227587 A1* | 7/2021 | Tsai | H04W 56/0045 |
| 2021/0345424 A1* | 11/2021 | Cirik | H04W 72/1263 |
| 2021/0392700 A1* | 12/2021 | Ohseki | H04W 72/044 |
| 2022/0225425 A1* | 7/2022 | Xing | H04L 5/0044 |

FOREIGN PATENT DOCUMENTS

| | | |
|---|---|---|
| CN | 108401539 A | 8/2018 |
| CN | 108496385 A | 9/2018 |
| EP | 3145252 B1 | 5/2020 |
| EP | 3771281 A1 | 1/2021 |
| WO | 2016119124 A1 | 8/2016 |
| WO | 2018127226 A1 | 7/2018 |

OTHER PUBLICATIONS

International Search Report issued in corresponding International Application No. PCT/CN2019/119003, mailed Aug. 6, 2020, 25 pages.

Written Opinion of the International Searching Authority issued in corresponding International Application No. PCT/CN2019/119003, mailed Aug. 6, 2020, 9 pages.

Notice of Reasons for Refusal issued in corresponding Japanese Application No. 2022-526818, mailed on Oct. 3, 2023, 9 pages.

"Remaining issue on 2-step RACH fall back procedure", Agenda item: 6.13.2, Source: Qualcomm Incorporated, 3GPP TSG-RAN WG2 Meeting #108, R2-1916065, Reno, Nevada, US, Nov. 18-22, 2019, 2 pages.

"MAC behaviour for LBT failures in Msg1 and Msg3 transmissions", Agenda Item: 11.2.1.1, Souce: MediaTek Inc., 3GPP TSG-RAN WG2 Meeting #105bis, R2-1904432, Xi'An, China, Apr. 8-12, 2019, 4 pages.

"Further Discussions on Fallback Procedure for 2-step RACH", Agenda Item: 6.13.2, Source: Huawei, HiSilicon, 3GPP TSG-RAN WG2 Meeting#108, R2-1916018, Reno, USA, Nov. 18-22, 2019, 2 pages.

First Office Action issued in corresponding Chinese Application No. 202311351963.1, dated Nov. 12, 2024, 13 pages.

* cited by examiner

RANDOM ACCESS PROBLEM REPORTING METHOD, TERMINAL DEVICE AND STORAGE MEDIUM

CROSS REFERENCE TO RELATED APPLICATION

This application is a continuation of International Application No. PCT/CN2019/119003 filed on Nov. 15, 2019, entitled "RANDOM ACCESS PROBLEM REPORTING METHOD, TERMINAL DEVICE AND STORAGE MEDIUM," the contents of which are incorporated herein by reference in its entirety.

TECHNICAL FIELD

The present disclosure relates to mobile communication technologies, and in particular to a random access problem reporting method, a terminal device and a storage medium.

BACKGROUND

Random access is a basic and important procedure in a communication system. Purposes of the random access include establishing uplink synchronization, establishing a unique cell radio network temporary identifier (C-RNTI) identified by a terminal, and requesting an uplink resource allocated by a network to a terminal. Therefore, the random access is not only used for initial access, but also used for new cell access during handover, access after radio link failure, and resuming of uplink synchronization if there is uplink/downlink data transmission.

Random access procedure includes a first type of random access and a second type of random access. In the first type of random access, four times of information exchange need to be performed between a terminal device and a network device. Accordingly, the first type of random access is also called a four-step random access (also referred to as 4-steps RACH). In the second type of random access, two times of information exchange need to be performed between the terminal device and the network device. Accordingly, the second type of random access is also called a two-step random access (also referred to as 2-steps RACH).

The two-step random access is in the process of standardization at present, which may reduce time delay while reducing signaling overhead. However, an uplink bandwidth part of the terminal device may only support the two-step random access, or may support both the two-step random access and the four-step random access. Therefore, how to control reporting of random access problem when a random access failure occurs becomes a technical problem to be solved.

SUMMARY

Embodiments of the present disclosure provide a random access problem reporting method, a terminal device and a storage medium, which may control the reporting of random access problem when a random access failure occurs in a case where an uplink bandwidth part of the terminal device supports random access.

In a first aspect, an embodiment of the present disclosure provides a random access problem reporting method, including: determining, by a terminal device, a random access attempt threshold according to a random access type supported by an uplink bandwidth part; and determining, by the terminal device, whether to report a random access problem, according to a relationship between the number of random access request transmissions and the random access attempt threshold, in response to a random access failure.

In a second aspect, an embodiment of the present disclosure provides a terminal device, including: a selection unit, configured to determine a random access attempt threshold according to a random access type supported by an uplink bandwidth part; and a determination unit, configured to determine whether to report a random access problem, according to a relationship between the number of random access request transmissions and the random access attempt threshold, in response to a random access failure.

In a third aspect, an embodiment of the present disclosure provides a terminal device, including a processor and a memory for storing a computer program that is capable of running on the processor. The processor is configured to perform, when running the computer program, steps of the random access problem reporting method performed by the terminal device as described above.

In a fourth aspect, an embodiment of the present disclosure provides a storage medium storing an executable program thereon. The executable program, when executed by a processor, implements the random access problem reporting method performed by the terminal device as described above.

The random access problem reporting method provided by an embodiment of the present disclosure includes: determining, by the terminal device, the random access attempt threshold according to the random access type supported by the uplink bandwidth part; and in response to a random access failure, determining, by the terminal device, whether to report the random access problem, according to the relationship between the number of random access request transmissions and the random access attempt threshold. Thus, the reporting of random access problem may be controlled in response to a random access failure in the case where the uplink bandwidth part of the terminal device supports random access.

DETAILED DESCRIPTION

In order to have a thorough understanding of features and technical contents of embodiments of the present disclosure, implementations of embodiments of the present disclosure will be described in detail below with reference to the accompanying drawings. The accompanying drawings are for reference only and are not used to limit embodiments of the present disclosure.

Before describing in detail a random access problem reporting method according to embodiments of the present disclosure, a brief description of a random access procedure is given first.

After a cell search procedure, a terminal device has already obtained downlink synchronization with a cell. Therefore, the terminal device may receive downlink data. However, the terminal device can perform uplink transmission only if it obtains uplink synchronization with the cell. The terminal device establishes a connection with the cell and obtains uplink synchronization with the cell through a random access procedure.

The main purpose of random access comprises: (1) to obtain uplink synchronization; (2) to assign a unique C-RNTI to the terminal device.

The random access procedure may be triggered by the following events.

1. UE establishes a wireless connection during an initial access, where UE goes from a radio resource control (RRC) idle state (that is, RRC_IDLE state) to a RRC connected state (that is, RRC_CONNECTED state). In the RRC_IDLE state, a RRC connection is not established, and in the RRC_CONNECTED state, the RRC connection is established.
2. RRC connection re-establishment procedure, where UE may re-establish the wireless connection after a radio link failure.
3. Handover, where UE needs to establish uplink synchronization with a new cell.
4. In the RRC_CONNECTED state, downlink (DL) data arrives. At this time, the uplink (UL) is in an out-of-synchronization state.
5. In the RRC_CONNECTED state, UL data arrives. At this time, the UL is in the out-of-synchronization state, or no physical uplink control channel (PUCCH) resource exists for sending a scheduling request (SR).
6. In the RRC_CONNECTED state, timing advance is required in order to locate the terminal device.
7. SR failure.
8. Synchronous reconfiguration request from RRC.
9. UE switches from a RRC inactive state (that is, the RRC_INACTIVE state) to the RRC_CONNECTED state.
10. Time calibration is established in a process of adding a secondary cell (SCell).
11. Requesting other system information (SI).
12. Beam failure recovery.

The random access procedure includes a first type of random access and a second type of random access. In the first type of random access, four times of information exchange need to be performed between a terminal device and a network device. Accordingly, the first type of random access is also called a four-step random access. In the second type of random access, two times of information exchange need to be performed between the terminal device and the network device. Accordingly, the second type of random access is also called a two-step random access.

The first type of random access supports a contention-based random access and a non-contention-based random access.

Figure 1:
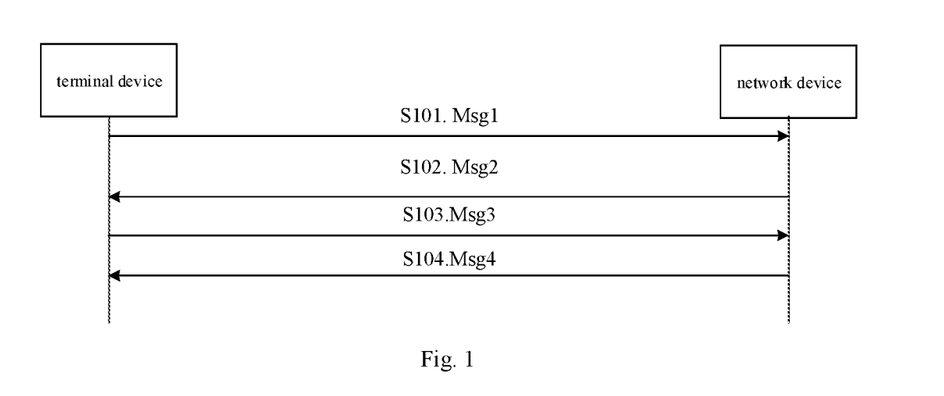
FIG. 1 is a schematic diagram of an optional random access processing flow according to an embodiment of the present disclosure.

A processing flow for the contention-based random access, as shown in FIG. 1, includes the following four steps S101-S104.

In S101, the terminal device sends a random access preamble to the network device through a message 1 (Msg1).

The terminal device selects a physical random access channel (PRACH) time domain resource, and sends the selected random access preamble on the selected PRACH time domain resource. The network device may estimate, based on the received preamble, uplink timing and a size of an uplink grant required for the terminal device to transmit message 3 (Msg3). The preamble is sent in a periodic random access occasion (RACH RO) configured by the network device.

The network device sends random access related parameters to the terminal device by broadcasting a system information block (SIB) 1. A reference signal receiving power (RSRP) threshold for a synchronization signal block (SSB) (also called rsrp-ThresholdSSB) in a RACH-ConfigCommon information element (IE) is used for SSB selection by the terminal device. The terminal device compares a RSRP measurement result under each SSB with rsrp-ThresholdSSB, and selects a SSB with the RSRP measurement result above rsrp-ThresholdSSB for access. If there is no SSB with the RSRP measurement result above rsrp-ThresholdSSB, then a SSB is randomly selected from all SSBs for access. Each SSB corresponds to a set of preamble resources and RO resources. The terminal device performs random selection from contention-based random access resources in the selected SSB, and sets a preamble index (PREAMBLE_INDEX) to be the selected random access preamble.

In S102, the network device sends a message 2 (Msg2) to the terminal device.

After detecting that the terminal device sends the preamble, the network device sends a random access response (RAR) message to the terminal device through Msg2, so as to inform the terminal device of uplink resource information available for sending Msg3, allocate a temporary radio network temporary identity (RNTI) to the terminal device, and provide a time advance command for the terminal device.

After sending the preamble, the terminal device may enable a RAR time window, and monitor a physical downlink control channel (PDCCH) scrambled by a random access radio network temporary identifier (RA-RNTI) in the RAR time window, so as to receive a RAR message corresponding to the RA-RNTI. The RA-RNTI is calculated based on a time-frequency position of the PRACH for sending the preamble. Therefore, if multiple UEs send their preambles on the same RO, the respective RARs are multiplexed in the same RAR media access control (MAC) protocol data unit (PDU). The RAR MAC PDU is composed of one or more MAC sub-protocol data units (subPDU) and an optional padding.

The MAC subPDU is composed of: a MAC sub-header only with a backoff indicator (BI), that is, a BI MAC sub-header (which may exist individually); a MAC sub-header only with a random access preamble identifier (RAPID), that is, RAPID MAC sub-header (i.e., confirmation to SI request, which may exist individually); and a MAC sub-header of the MAC RAR with RAPID.

The MAC sub-header with BI consists of five header fields: E (Extension)/T (Type)/R (Reserved)/R/BI. The MAC sub-header only with RAPID and the MAC sub-header of the MAC RAR with RAPID consist of three header fields respectively: E/T/RAPID. In this case, R is a reserved field with a value of 0 or 1; and E indicates whether the current MAC subPDU is the last one. When the value of E is 0, it indicates that the current MAC subPDU is the last one. When the value of E is 1, it indicates that there is at least one MAC subPDU after the current MAC subPDU. When T is 0, it indicates the BI MAC header. When T is 1, it indicates the RAPID MAC header. BI indicates an overload condition of the current cell. RAPID indicates the transmitted random access preamble.

If the terminal device has successfully received the PDCCH scrambled by the RA-RNTI corresponding to the RO resource for sending the preamble, and the RAR contains the RAPID carried by the MAC subPDU corresponding to the PREAMBLE_INDEX selected in S101, the RAR reception is successful, and the terminal may perform decoding to obtain a timing advance command (TAC), uplink grant, and temporary C-RNTI (TC-RNTI).

If the PDCCH scrambled by the RA-RNTI corresponding to the RO resource for sending the preamble is not received within the RAR time window, or the PDCCH scrambled by the RA-RNTI is received, but the RAR does not contain the MAC subPDU corresponding to PREAMBLE_INDEX, it is considered that the RAR reception fails. In this case, if the number of preamble transmissions does not exceed the maximum number of preamble transmissions (preambleTransMax) configured by the network, the terminal device needs to retransmit Msg1. If the number of preamble transmissions exceeds the preambleTransMax configured by the network, the terminal device reports the random access problem to a higher layer.

In S103, the terminal device sends Msg3 to the network device.

If the terminal device has successfully received the RAR message, it sends Msg3, which is a PUSCH scheduled by the RAR message.

Msg3 is mainly used to notify the network device about what event triggered the random access procedure.

For example, if it is an initial random access procedure, Msg3 may carry a UE ID and an establishment cause. If it is the RRC reestablishment, Msg3 may carry a connected UE identifier and the establishment cause. Msg3 needs to contain the unique identifier of UE, which is used for contention resolution in S104.

In S103, the UE may carry its own unique identifier in Msg3: C-RNTI or UE identifier (S-TMSI or a random number) from a core network. For UE in the RRC_CONNECTED state, its unique identifier is C-RNTI. For UE in a non-RRC_CONNECTED state, an unique UE identifier (S-TMSI or a random number) from the core network may be used.

After the terminal device sends Msg3, a MAC entity of the terminal will start the following operations.

1>. Starting a random access contention resolution timer (ra-ContentionResolutionTimer) and restarting the random access contention resolution timer (ra-ContentionResolutionTimer) at a first symbol after each Msg3 retransmission.

2>. Monitoring C-RNTI or TC-RNTIPDCCH during the operation period of ra-ContentionResolutionTimer, that is, monitoring a contention resolution message sent by the network.

In step S104, the network device sends Msg4 to the terminal device.

Msg4 contains the contention resolution message, and allocates an uplink transmission resource for the terminal device at the same time.

In a contention resolution mechanism, the network device may carry the unique identifier in Msg4, so as to specify a winning terminal device. Other terminal devices that did not win in the contention resolution may re-initiate the random access. The PDCCH of Msg4 is scrambled by using C-RNTI or TC-RNTI.

For the terminal device in the RRC_CONNECTED state, receipt of the PDCCH scrambled by C-RNTI during the operation period of ra-ContentionResolutionTimer is considered to be successful. For the terminal device in the non-RRC_CONNECTED state, if the PDCCH scrambled by the TC-RNTI is received during the operation period of ra-ContentionResolutionTimer, and the CRID contained in the MAC PDU corresponding to the successfully decoded Msg4 matches the CCCH SDU sent by Msg3, it is considered that the contention resolution is successful and the random access procedure of the terminal device is successful.

In a case where ra-ContentionResolutionTimer expires or the contention resolution fails (that is, the random access fails), if the number of preamble transmissions does not exceed preambleTransMax, the terminal device needs to retransmit Msg1; and if the number of preamble transmissions exceeds preambleTransMax, the terminal device reports the random access problem to an upper layer.

Figure 2:
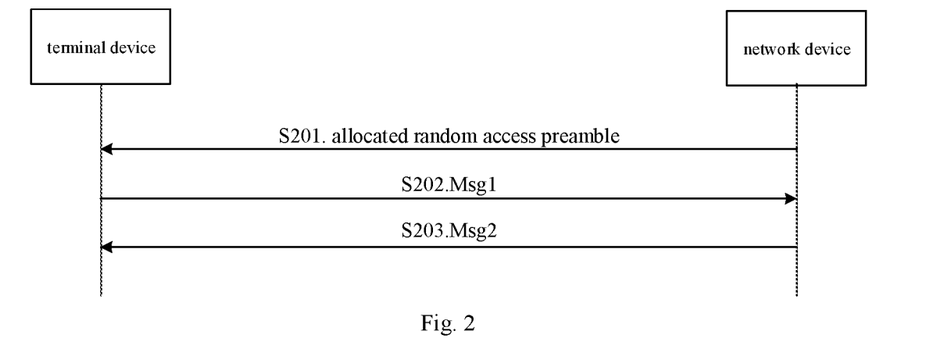
FIG. 2 is a schematic diagram of an optional random access processing flow according to an embodiment of the present disclosure.

A processing flow for the non-contention-based random access, as shown in FIG. 2, includes the following three steps S201-S203.

In S201, the network device sends an allocated random access preamble to the terminal device.

In S202, the terminal device sends a random access preamble to the network device through Msg1.

For the non-contention-based random access, the PRACH time domain resource and the preamble may be specified by the network device.

In S203, the network device sends Msg2 to the terminal device.

After the network device detects that the terminal device sends the preamble, it sends an RAR to the terminal device through Msg2.

After sending Msg1, the terminal device enables a random access response time window, and monitors the PDCCH scrambled by the RA-RNTI within the random access response time window. For the description about the random access response, reference may be made to the description in S102.

For the non-contention-based random access, after the terminal device has successfully received Msg2, the random access procedure ends.

Figure 3:
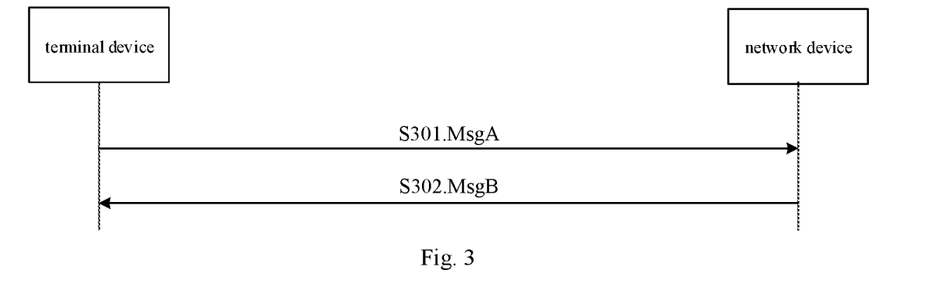
FIG. 3 is a schematic diagram of an optional random access processing flow according to an embodiment of the present disclosure.

Compared with the first type of random access, the second type of random access may improve the time delay while reducing the signaling overhead. A processing flow for the second type of random access is shown in FIG. 3, including the following steps S301-S302.

In S301, the terminal device sends MsgA to the network device.

MsgA contains the preamble and an uplink data part (for example, carried by PUSCH). The preamble is content of Msg1 in the first type of random access. The uplink data part carries identification information of UE and/or a cause for the RRC request, and is content of Msg3 in the first type of random access.

In step S302, the network device sends MsgB to the terminal device.

MsgB contains the contention resolution information and allocation information of TAC and C-RNTI, etc. MsgB is equivalent to Msg2 and Msg4 in the first type of random access.

Figure 4:
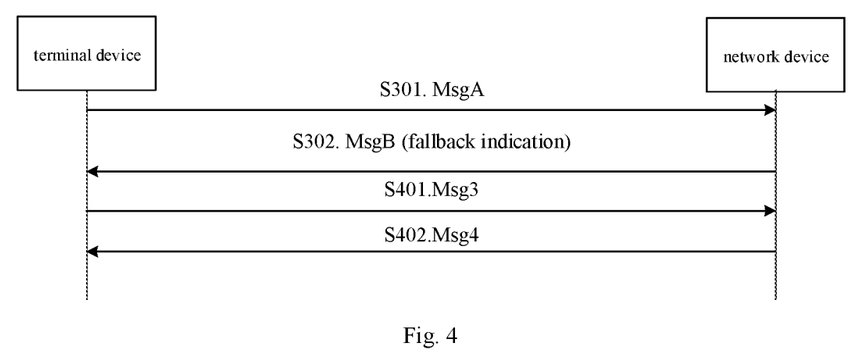
FIG. 4 is a schematic diagram of an optional random access processing flow according to an embodiment of the present disclosure.

Based on the 2-step RACH shown in FIG. 3, as shown in FIG. 4, if a fallback indication is received in MsgB, the terminal device executes S401 where Msg3 is sent to the network device, and monitors Msg4 in S402. If the contention resolution is unsuccessful after the transmission of Msg3, the terminal device continues to execute S301 to transmit MsgA.

When a random access type corresponding to a resource for random access on an uplink (UL) bandwidth part (BWP) includes the following two cases: Case 1 and Case 2.

Case 1 only corresponds to the two-step random access.

Case 2 includes the two-step random access and the four-step random access.

In the related art, no discussion is involved about how to report the random access problem in the above two cases.

In view of above, an embodiment of the present disclosure provides a random access problem reporting method, which may be applied to various communication systems, such as a Long Term Evolution (LTE) system, an LTE Frequency Division Duplex (FDD) system, an LTE Time Division Duplex (TDD) system, a Universal Mobile Telecommunication System (UMTS), a 5G system or a future communication system, etc.

Figure 5:
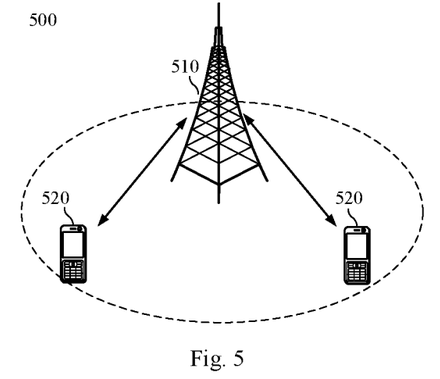
FIG. 5 is a schematic diagram of an optional composition structure of a communication system according to an embodiment of the present disclosure.

As an example, a communication system 500 applied in an embodiment of the present disclosure is shown in FIG. 5. The communication system 500 may include a network device 510. The network device 510 may be a device that communicates with a terminal device 520 (or called a communication terminal or a terminal). The network device 510 may provide communication coverage over a specific geographic area, and may communicate with terminal devices in the coverage area. Optionally, the network device 510 may be an evolved base station (also referred to as Evolutional Node B, eNB or eNodeB) in an LTE system, a gNB in a NR/5G system, or a wireless controller in a Cloud Radio Access Network (CRAN).

The communication system 500 may also include a wireless controller in a Cloud Radio Access Network (CRAN), a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 500 further includes at least one terminal device 520 within the coverage area of at least one network device 510. The term "terminal device" as used herein includes but is not limited to an apparatus configured to receive/send a communication signal, via a wired connection, for example, via Public Switched Telephone Networks (PSTN), a Digital Subscriber Line (DSL), a digital cable, a direct cable connection; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone; a Personal Communication System (PCS) terminal which may combine a cellular radio telephone and data processing, faxing, and data communication capabilities; a PDA that may include a radio telephone, a pager, an Internet/intranet access, a Web browser, a memo pad, a calendar, and/or a Global Positioning System (GPS) receiver; and a conventional laptop and/or palmtop receiver or another electronic apparatus including a radio telephone transceiver. The terminal device may be an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, other processing device connected to a wireless modem, a vehicle-mounted device, a wearable device, a terminal device in a 5G network, a terminal device in a future evolved Public Land Mobile Network (PLMN), or the like.

Optionally, the 5G system or 5G network may also be referred to as a New Radio (NR) system or NR network.

FIG. 5 exemplarily shows one network device and two terminal devices. Optionally, the communication system 500 may include multiple terminal devices and multiple network devices, and the coverage of each network device may include other numbers of terminal devices. Embodiments of the present disclosure do not impose specific limitations in this regard.

Optionally, the communication system 500 may also include other network entities such as a network controller or a mobility management entity. Embodiments of the present disclosure do not impose specific limitations in this regard.

Figure 6:
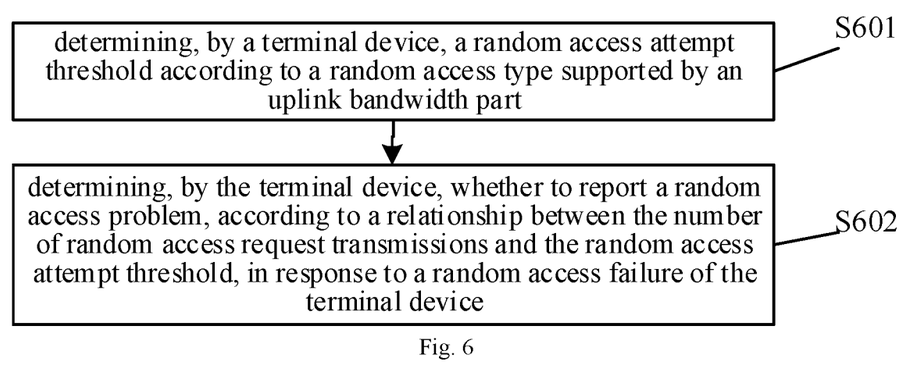
FIG. 6 is a schematic diagram of an optional processing flow for a random access problem reporting method according to an embodiment of the present disclosure.

An optional processing flow of a random access problem reporting method according to some embodiments of the present disclosure, as shown in FIG. 6, includes the following steps S601 and S602.

In S601, a terminal device determines a random access attempt threshold according to a random access type supported by an uplink bandwidth part.

In some embodiments of the present disclosure, the random access type supported by the uplink bandwidth part is a random access type corresponding to a resource used for random access in the uplink bandwidth part.

The random access type corresponding to the resource used for random access in the uplink bandwidth part being a two-step random access in Case 1 is taken as an example. In this case, only a two-step random access resource is configured in the uplink bandwidth part, and the uplink bandwidth part of the terminal device only supports the two-step random access.

When the uplink bandwidth part of the terminal device only supports the two-step random access, the random access attempt threshold includes a first attempt threshold, and the first attempt threshold is used to determine whether to report the random access problem. The first attempt threshold may also be referred to as the first maximum number of two-step random access attempts.

In some embodiments of the present disclosure, the first attempt threshold is indicated by N1.

In a case where only the two-step random access resource is configured in the current uplink bandwidth part, only the two-step random access may be performed in the current uplink bandwidth part.

The random access type corresponding to the resource used for random access in the uplink bandwidth part including the two-step random access and the four-step random access in Case 2 is taken as an example. In this case, both the two-step random access resource and the four-step random access resource are configured in the uplink bandwidth part, and the uplink bandwidth part of the terminal device supports both the two-step random access and four-step random access.

When the uplink bandwidth part of the terminal device supports both the two-step random access and the four-step random access, the random access attempt threshold includes a third attempt threshold, and the third attempt threshold is used to determine whether to report the random access problem. The third attempt threshold may also be referred to as the maximum number of four-step random access attempts.

When both the two-step random access resource and the four-step random access resource are configured in the current uplink bandwidth part, the current uplink bandwidth part may perform the two-step random access or the four-step random access.

In some embodiments of the present disclosure, K is used to indicate the third attempt threshold.

Optionally, N1 is less than or equal to K.

In some embodiments of the present disclosure, the terminal device includes one or more uplink bandwidth parts used to perform the random access procedure. At a certain time, only one uplink bandwidth part is activated to perform the random access procedure.

In S602, when the terminal device fails in random access, the terminal device determines whether to report a random access problem according to a relationship between the number of random access request transmissions and the random access attempt threshold.

In some embodiments of the present disclosure, when the terminal performs the two-step random access, the random access request as sent is MsgA. Alternatively, when the terminal performs the four-step random access, the random access request as sent is Msg1.

Figure 7:
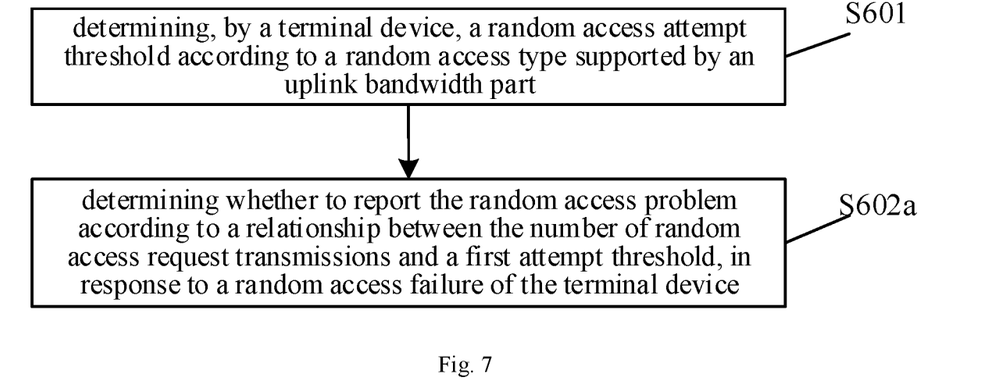
FIG. 7 is a schematic diagram of an optional processing flow for a random access problem reporting method according to an embodiment of the present disclosure.

In a case where the uplink bandwidth part only supports the two-step random access, as shown in FIG. 7, the step S602 includes the following sub-step S602a.

In S602a, when the terminal device fails in random access, the terminal device determines whether to report the random access problem according to a relationship between the number of random access request transmissions and the first attempt threshold.

In this case, the determining whether to report the random access problem according to the relationship between the number of random access request transmissions and the random access attempt threshold includes: determining whether to report the random access problem according to the relationship between the number of random access request transmissions and the first attempt threshold.

Optionally, the first attempt threshold is configured by a network device. In an example, the network device configures the first attempt threshold in a two-step random access parameter field.

A scheme for determining whether to report the random access problem according to the relationship between the number of random access request transmissions and the first attempt threshold in S602a includes one of the following schemes: Scheme 1 to Scheme 3.

In Scheme 1, when the number of random access request transmissions reaches the first attempt threshold, it is determined to report the random access problem. Alternatively, when the number of random access request transmissions does not reach the first attempt threshold, it is determined not to report the random access problem.

In Scheme 2, when the number of random access request transmissions reaches the first attempt threshold and the number of random access request transmissions does not reach a random access problem reporting threshold, it is determined not to report the random access problem. Alternatively, when the number of random access request transmissions reaches the first attempt threshold and the number of random access request transmissions reaches the random access problem reporting threshold, it is determined to report the random access problem. The random access problem reporting threshold is greater than the first attempt threshold.

In Scheme 3, when the number of random access request transmissions reaches the first attempt threshold and a problem reporting timer does not expire, it is determined not to report the random access problem. Alternatively, when the number of random access request transmissions reaches the first attempt threshold and the problem reporting timer expires, it is determined to report the random access problem.

The Scheme 1 for determining whether to report the random access problem according to the relationship between the number of random access request transmissions and the first attempt threshold is taken as an example. In this case, when the number of random access request transmissions reaches the first attempt threshold but the random access still fails, the terminal device reports the random access problem. Alternatively, when the number of random access requests sent by the terminal device upon a successful random access does not exceed N1, the terminal device does not report the random access problem.

Optionally, the first attempt threshold is greater than a second attempt threshold. The second attempt threshold is used by the terminal device to determine whether to fall back to the four-step random access from the two-step random access in a case where the two-step random access resource and the four-step random access resource are configured in the uplink bandwidth part of the terminal device. The second attempt threshold may also be referred to as the second maximum number of two-step random access attempts.

In some embodiments of the present disclosure, the second attempt threshold is indicated by N2. In some embodiments of the present disclosure, N2 is less than K.

Optionally, the second attempt threshold is configured by the network device. In an example, the network device configures the second attempt threshold in a two-step random access parameter field.

The Scheme 2 for determining whether to report the random access problem according to the relationship between the number of random access request transmissions and the first attempt threshold is taken as an example. In this case, when the number of random access requests sent by the terminal device reaches the random access problem reporting threshold, and the random access fails, it is determined to report the random access problem.

Here, the random access problem reporting threshold is introduced. When the number of random access request transmissions reaches the first attempt threshold but the random access still fails, it may continue to try the two-step random access, until the number of random access request transmissions reaches the random access problem reporting threshold. If the random access is still unsuccessful, the random access problem is reported.

Optionally, the first attempt threshold is equal to the second attempt threshold, that is, N1=N2.

In some embodiments of the present disclosure, the random access problem reporting threshold is indicated by M. When the number of random access requests sent by the terminal device upon a successful random access does not exceed M, the terminal device does not report the random access problem.

Optionally, the random access problem reporting threshold is configured by the network device. In an example, the network device configures the random access problem reporting threshold in a two-step random access parameter field. N1 is less than M.

The Scheme 3 for determining whether to report the random access problem according to the relationship between the number of random access request transmissions and the first attempt threshold is taken as an example. In this case, when the number of random access request transmissions reaches the first attempt threshold, and the random access fails, it is determined whether the problem reporting timer expires. If the problem reporting timer does not expire, it continues to send the random access request, until the problem reporting timer expires and the random access still fails. Then, it is determined to report the random access problem.

Here, the problem reporting timer is introduced. When the number of random access request transmissions reaches the first attempt threshold but the random access still fails, it may continue to try the two-step random access, until the problem reporting timer expires. If the random access is still unsuccessful, the random access problem is reported. When the terminal device succeeds in the random access before the problem reporting timer expires, the terminal device does not report the random access problem.

In some embodiments of the present disclosure, a starting occasion of the problem reporting timer includes: a time when the random access request is sent for the first time; or a time when the number of random access request transmissions reaches the first attempt threshold.

In a case where the starting occasion of the problem reporting timer is the time when the random access request is sent for the first time, the terminal device starts the problem reporting timer when sending MsgA for the first time. In this case, a duration of the problem reporting timer is greater than a duration required to send N1 random access requests.

In a case where the starting occasion of the problem reporting timer is the time when the number of random access request transmissions reaches the first attempt threshold, the terminal device starts the problem reporting timer in a case where the terminal device has transmitted MsgA for N1 times and the random access fails.

Optionally, the duration of the problem reporting timer is configured by the network device. In an example, the network device configures the duration of the problem reporting timer in a two-step random access parameter field.

Figure 8:
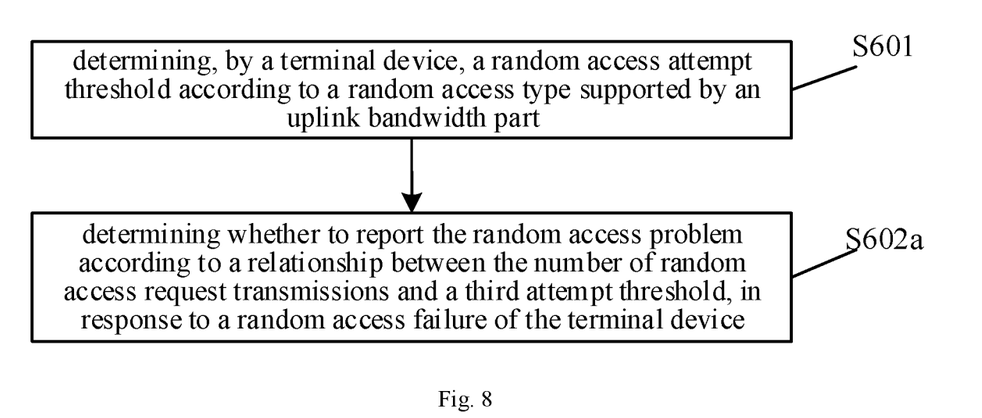
FIG. 8 is a schematic diagram of an optional processing flow for a random access problem reporting method according to an embodiment of the present disclosure.

In a case where the uplink bandwidth part supports both the two-step random access and the four-step random access, as shown in FIG. 8, the step S602 includes the following sub-step S602*b*.

In S602*b*, when the terminal device fails in the random access, the terminal device determines whether to report the random access problem according to a relationship between the number of random access request transmissions and the third attempt threshold.

In this case, the determining whether to report the random access problem according to the relationship between the number of random access request transmissions and the random access threshold includes: determining whether to report the random access problem according to the relationship between the number of random access request transmissions and the third attempt threshold.

In some embodiments of the present disclosure, a scheme for determining whether to report the random access problem according to the relationship between the number of random access request transmissions and the third attempt threshold includes: determining to report the random access problem, when the number of random access request transmissions reaches the third attempt threshold, and determining not to report the random access problem, when the number of random access request transmissions does not reach the third attempt threshold.

In some embodiments of the present disclosure, in a case where both the two-step random access resource and the four-step random access resource are configured in the uplink bandwidth part of the terminal device, it is determined whether to report the random access problem according to the relationship between the number of random access request transmissions and the third attempt threshold.

Here, when the number of random access request transmissions reaches the third attempt threshold but the random access still fails, the terminal device reports the random access problem. When the number of random access requests sent by the terminal device upon a successful random access does not exceed the third attempt threshold K, the terminal device does not report the random access problem.

Optionally, the third attempt threshold is configured by the network device. In an example, the network device configures the third attempt threshold in a four-step random access parameter field.

In some embodiments of the present disclosure, in a case where the random access type supported by the uplink bandwidth part includes the two-step random access and the four-step random access, the method further includes: falling back, by the terminal device, from a two-step random access procedure to a four-step random access procedure, in response that the random access request sent by the terminal device is a message A, the number of random access request transmissions reaches the second attempt threshold, and the random access fails.

In some embodiments of the present disclosure, when the terminal device falls back from the two-step random access procedure to the four-step random access procedure, the terminal device sends Msg3 to the network device after receiving MsgB.

When the number of times that the terminal device sends MsgA reaches N2 and the random access fails, the terminal device sends Msg3, and falls back from the two-step random access to the four-step random access to continue the random access attempt. If the random access is unsuccessful after the transmission of Msg3, the terminal device continues to transmit MsgA to perform the two-step random access.

In some embodiments of the present disclosure, based on whether the type supported by the uplink bandwidth part is the two-step random access (that is, only the two-step random access resource is configured), or both the two-step random access and the four-step random access (that is, both the two-step random access resource and the four-step random access resource are configured), and further based on the random access attempt threshold as selected, the reporting of random access problem upon a random access failure may be controlled.

Hereinafter, the random access problem reporting method according to some embodiments of the present disclosure will be illustrated by using different examples.

In some embodiments of the present disclosure, parameters configured based on the random access type corresponding to the resource used for random access include the following Configurations 1 and 2.

In Configuration 1, both the two-step random access resource and the four-step random access resource are configured in the UL BWP, and the network device configures K in the four-step random access parameter field and configures N2 in the two-step random access parameter field.

In Configuration 2, when only the two-step random access resource is configured in the UL BWP, the network device configures N2 in the two-step random access parameter field.

The scheme for determining whether to perform the random access reporting in the above Configure 2 includes the following Schemes A-C.

In Scheme A, N1>N2 (for example, N1=K). When UE tries the two-step random access for N1 times but fails to access successfully, the random access problem is reported.

In Scheme B, N2=N1, and a new parameter M is introduced, where M>N1 (for example, M=K). When UE tries the two-step random access for N1 times, and cannot fall back to the four-step random access, the UE continues trying the two-step random access until M times. If the access is still not successful, the random access problem is reported.

In Scheme C, the problem reporting timer is introduced in the two-step random access configuration, and the problem reporting timer is started after the initial transmission of MsgA. After trying the two-step random access for N1 times, UE continues performing the two-step random access until the problem reporting timer expires, and if the access is still unsuccessful, the random access problem is reported.

Figure 9:
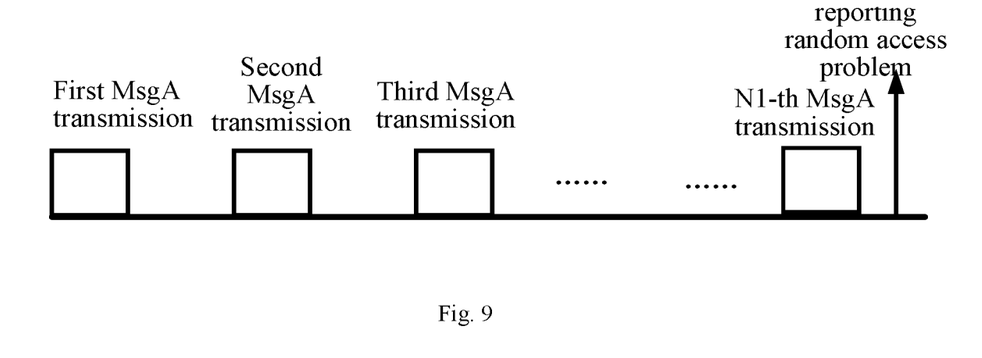
FIG. 9 is a schematic diagram of an optional timing relationship according to an embodiment of the present disclosure.

As a first example, the Scheme A is adopted in which only the two-step random access resource is configured in the UL BWP Only the two-step random access resource is configured in the current UL BWP, and the network device configures the first attempt threshold N1 for the UE. The terminal device attempts the two-step random access on the current UL BWP. When the number of Msg A transmissions exceeds N1, the UE reports the random access problem, as shown in FIG. 9.

Figure 10:
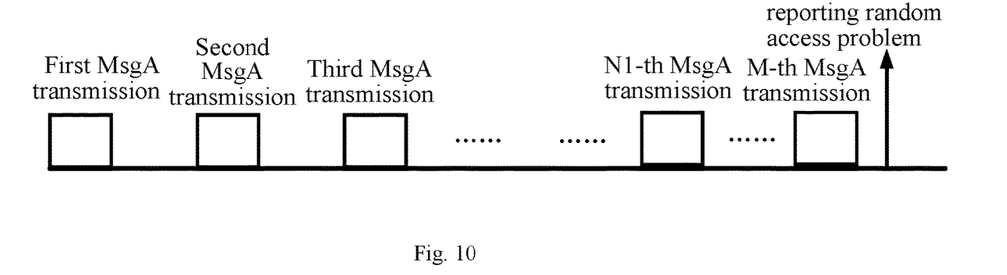
FIG. 10 is a schematic diagram of an optional timing relationship according to an embodiment of the present disclosure.

As a second example 2, the Scheme B is adopted in which only the two-step random access resource is configured in the UL BWP Only the two-step random access resource is configured in the current UL BWP, and the network device configures the first attempt threshold N1 and the random access problem reporting threshold M for the UE. The UE tries the two-step random access on the current UL BWP. When the number of MsgA transmissions exceeds N1, the UE continues performing the two-step random access. When the number of MsgA transmissions exceeds M, the UE reports the random access problem, as shown in FIG. 10.

Figure 11:
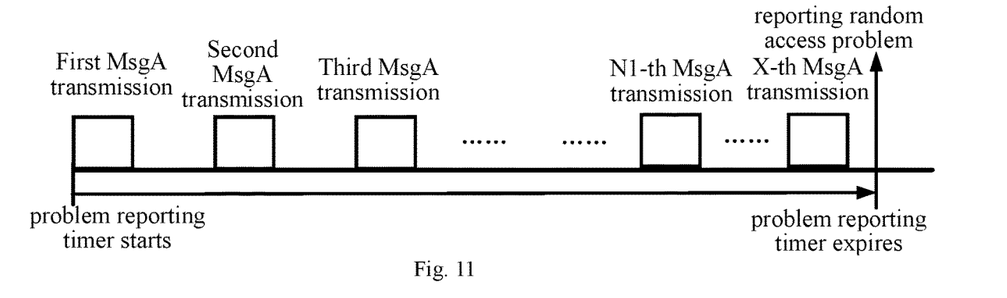
FIG. 11 is a schematic diagram of an optional timing relationship according to an embodiment of the present disclosure.

As a third example, the Scheme C is adopted in which only the two-step random access resource is configured in the UL BWP Only the two-step random access resource is configured in the current UL BWP, and the network device configures the first attempt threshold N1 and the problem reporting timer for the UE. The UE tries the two-step random access on the current UL BWP. When the number of MsgA transmissions exceeds N1, the UE continues performing the two-step random access until the timer expires. If the access is still not successful, the UE reports the random access problem, as shown in FIG. 11. After the X-th transmission of MsgA, the problem reporting timer expires, and then the random access problem is reported.

As a fourth example, both the two-step random access resource and the four-step random access resource are configured in the UL BWP.

When both the two-step random access resource and the four-step random access resource are configured in the UL BWP, the UE needs to select the random access type. Assuming that the RSRP measured by UE is higher than a configured threshold, the UE enters the two-step random access procedure. If the UE fails to access successfully after N2 two-step random access attempts, the UE may fall back to the four-step random access and continue the access attempt. When the number of preamble transmissions exceeds K and the random access fails, the UE reports the random access problem. N2 is configured in the two-step random access parameter field, K is configured in the four-step random access parameter field, and N1 has a value less than K.

It should be noted that if the UE fails to access after N2 two-step random access attempts, the UE cannot fall back to the four-step random access at this time. Therefore, the random access problem needs to be reported after the N2 two-step random access attempts fail. If the value of N2 is relatively small, the failure of the two-step random access may be caused by insufficient power increase, and reporting of the random access problem at this time may cause unnecessary access delay.

When only the two-step random access resource is configured in the UL BWP, and N1 is greater than N2, the UE fails to access after N1 two-step random access attempts, and then the random access problem is reported. Due to the existence of fallback, N1 is usually set to be small, and N2 is greater than N1. This prevents the UE from reporting the random access problem too early due to insufficient power increase, thereby avoiding the introduction of unnecessary access delay.

When only the two-step random access resource is configured in the UL BWP, N1 is equal to N2, and the UE fails to access after N1 two-step random access attempts, the UE continues performing the random access attempts until the access is still unsuccessful after M two-step random access attempts, and then the random access problem is reported. Here, the parameter setting for N2 (N1=N2) in the two-step random access resource is not changed, and the new parameter is introduced to prevent the UE from reporting the random access problem too early.

When only the two-step random access resource is configured in the UL BWP, and the access is still unsuccessful after N1 two-step random access attempts, the random access attempts are continued until the problem reporting timer expires and the access is not successful. Then, the random access problem is reported. Here, the timer is introduced to prevent the UE from reporting the random access problem too early.

Figure 12:
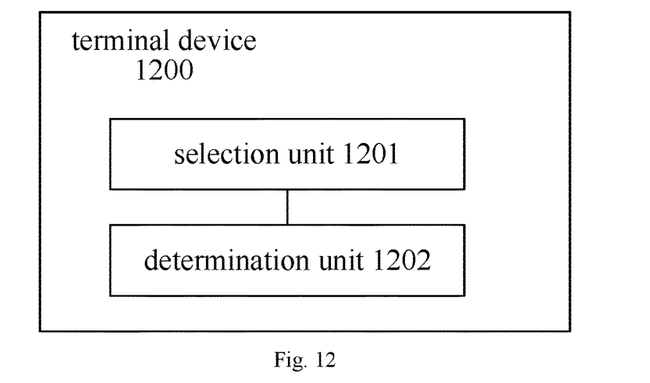
FIG. 12 is a schematic diagram of an optional structure for a terminal device according to an embodiment of the present disclosure.

In order to implement the foregoing random access problem reporting method, an embodiment of the present disclosure also provides a terminal device. A composition structure of the terminal device is as shown in FIG. 12, and the terminal device 1200 includes: a selection unit 1201, configured to determine a random access attempt threshold according to a random access type supported by an uplink bandwidth part of the terminal device; and a determination unit 1202, configured to determine whether to report a random access problem, according to a relationship between the number of random access request transmissions and the random access attempt threshold, in response to a random access failure.

In some embodiments of the present disclosure, the determination unit 1202 is further configured to: determine whether to report the random access problem according to a relationship between the number of random access request transmissions and a first attempt threshold in a case where only a two-step random access is supported by the uplink bandwidth part of the terminal device.

In some embodiments of the present disclosure, the determination unit 1202 is further configured to: determine to report the random access problem when the number of random access request transmissions reaches the first attempt threshold; and determine not to report the random access problem when the number of random access request transmissions does not reach the first attempt threshold.

In some embodiments of the present disclosure, the first attempt threshold is greater than a second attempt threshold.

In some embodiments of the present disclosure, the determination unit 1202 is further configured to: determine not to report the random access problem when the number of random access request transmissions reaches the first attempt threshold and the number of random access request transmissions does not reach a random access problem reporting threshold; and determine to report the random access problem when the number of random access request transmissions reaches the first attempt threshold and the number of random access request transmissions reaches the random access problem reporting threshold, where the random access problem reporting threshold is greater than the first attempt threshold.

In some embodiments of the present disclosure, the first attempt threshold is equal to the second attempt threshold.

In some embodiments of the present disclosure, the random access problem reporting threshold is configured by a network device.

In some embodiments of the present disclosure, the determination unit 1202 is further configured to: determine not to report the random access problem when the number of random access request transmissions reaches the first attempt threshold and a problem reporting timer does not expire; and determine to report the random access problem when the number of random access request transmissions reaches the first attempt threshold and the problem reporting timer expires.

In some embodiments of the present disclosure, a starting occasion of the problem reporting timer includes: a time when the random access request is sent for the first time; or a time when the number of random access request transmissions reaches the first attempt threshold.

In some embodiments of the present disclosure, a duration of the problem reporting timer is configured by the network device.

In some embodiments of the present disclosure, the first attempt threshold is configured by the network device.

In some embodiments of the present disclosure, the determination unit 1202 is further configured to: determine whether to report the random access problem according to a relationship between the number of random access request transmissions and a third attempt threshold in a case where both the two-step random access and the four-step random access are supported by the uplink bandwidth part of the terminal device.

In some embodiments of the present disclosure, the determination unit 1202 is further configured to: determine to report the random access problem when the number of random access request transmissions reaches the third attempt threshold; and determine not to report the random access problem when the number of random access request transmissions does not reach the third attempt threshold.

In some embodiments of the present disclosure, the terminal device 1200 further includes: a fallback unit, configured to fall back from the two-step random access procedure to the four-step random access procedure when the random access request sent by the terminal device is Message A and the number of random access request transmissions reaches the second attempt threshold and the random access is failed.

An embodiment of the present disclosure also provides a terminal device, including a processor and a memory for storing a computer program that can run on the processor. The processor is configured to implement steps of the random access problem reporting method performed by the terminal device as described above, when running the computer program.

Figure 13:
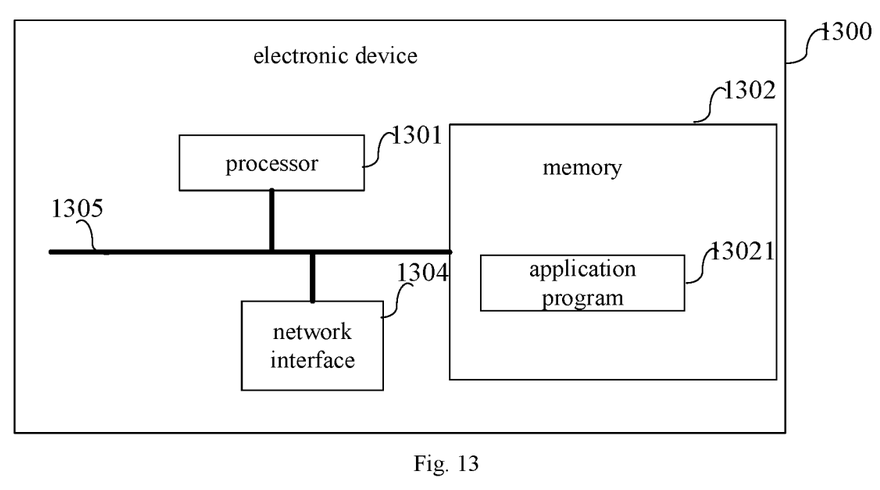
FIG. 13 is a schematic diagram of an optional structure for an electronic device according to an embodiment of the present disclosure.

FIG. 13 is a schematic diagram of the hardware composition structure of an electronic device (which may be a terminal device) according to an embodiment of the present disclosure. The electronic device 1300 includes at least one processor 1301, a memory 1302, and at least one network interface 1304. The various components in the electronic device 1300 are coupled together through the bus system 1305. It may be understood that the bus system 1305 is used to implement connection and communication between these components. In addition to the data bus, the bus system 1305 further includes a power bus, a control bus, and a status signal bus. However, for the sake of clear description, various buses are marked as the bus system 1305 in FIG. 13.

It may be understood that the memory 1302 may be a volatile memory or a non-volatile memory, and may also include both volatile and non-volatile memory. The non-volatile memory may be ROM, Programmable Read-Only Memory (PROM), Erasable Programmable Read-Only Memory (EPROM), electrically erasable Programmable read-only memory (EEPROM), ferromagnetic random access memory (FRAM), Flash Memory, magnetic surface memory, optical disk, or Compact Disc Read-Only Memory (CD-ROM). Magnetic surface memory may be disk memory or tape memory. The volatile memory may be a random access memory (RAM), which is used as an external cache. By way of exemplary but not restrictive description, many forms of RAM are available, such as static random access memory (SRAM), synchronous static random access memory (SSRAM), dynamic random access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), and Direct Rambus Random Access Memory (DRRAM)). The memory 1302 described in embodiments of the present disclosure is intended to include, but is not limited to, these and any other suitable types of memory.

The memory 1302 according to some embodiments of the present disclosure is used to store various types of data to support the operation of the electronic device 1300. Examples of these data include any computer program operating on the electronic device 1300, such as an application program 13021. The program for implementing the method according to embodiments of the present disclosure may be included in the application program 13021.

The method described in embodiments of the present disclosure may be applied to the processor 1301 or implemented by the processor 1301. The processor 1301 may be an integrated circuit chip with signal processing capabilities. In the implementation process, steps of the foregoing method may be completed by a hardware integrated logic circuit in the processor 1301 or instructions in the form of software. The processor 1301 may be a general-purpose processor, a digital signal processor (DSP), other programmable logic devices, discrete gate or transistor logic devices, discrete hardware components, and the like. The processor 1301 may implement or perform various methods, steps, and logical block diagrams disclosed in embodiments of the present disclosure. The general-purpose processor may be a microprocessor or any conventional processor or the like. Steps of the method disclosed in embodiments of the present disclosure may be directly embodied as being executed and completed by a hardware decoding processor, or executed and completed by a combination of hardware and software modules in the decoding processor. The software module may be located in a storage medium, and the storage medium is located in the memory 1302. The processor 1301 reads information from the memory 1302 and completes steps of the foregoing method in combination with hardware thereof.

In an exemplary embodiment, the electronic device 1300 may be embodied as one or more application specific integrated circuits (ASIC), DSP, Programmable Logic Device (PLD), complex programmable logic device (CPLD), FPGA, general-purpose processor, controller, MCU, MPU, or other electronic components to implement the foregoing method.

An embodiment of the present disclosure further provide a storage medium for storing a computer program.

Optionally, the storage medium may be applied to the terminal device provided in embodiments of the present disclosure, and the computer program causes the computer to execute the corresponding process in each method according to embodiments of the present disclosure. For brevity, details are not described herein again.

The present disclosure is described with reference to flowcharts and/or block diagrams of methods, devices (or systems), and computer program products according to embodiments of the present disclosure. It should be understood that each process and/or block in the flowchart and/or block diagram, and the combination of processes and/or blocks in the flowchart and/or block diagram may be implemented by computer program instructions. These computer program instructions may be provided to the processor of a general-purpose computer, a special-purpose computer, an embedded processor, or other programmable data processing device to generate a machine, so that a device that implements functions specified in one process or multiple processes in the flowchart and/or one block or multiple blocks in the block diagram is generated through instructions executed by the processor of the computer or other programmable data processing device.

These computer program instructions may also be stored in a computer-readable memory that may direct a computer or other programmable data processing device to work in a specific way, so that instructions stored in the computer-readable memory produce an article of manufacture including the instruction device. The instruction device implements functions specified in one process or multiple processes in the flowchart and/or one block or multiple blocks in the block diagram.

These computer program instructions may also be loaded on a computer or other programmable data processing device, so that a series of operation steps are executed on the computer or other programmable device to produce computer-implemented processing. Thus, instructions executed on the computer or other programmable device provide steps for implementing functions specified in one flow or multiple flows in the flowchart and/or one block or multiple blocks in the block diagram.

The above are only some embodiments of the present disclosure, but the scope of protection of the present disclosure is not limited merely to it. Any modifications, equivalent substitutions and improvement made within the spirit and principle of the present disclosure fall within the protection scope of the present disclosure.

What is claimed is:

1. A random access problem reporting method, comprising:
    determining, by a terminal device, a random access attempt threshold according to a random access type supported by an uplink bandwidth part; and
    in response to a random access failure of the terminal device, determining, by the terminal device, whether to report a random access problem, according to a relationship between the number of random access request transmissions and the random access attempt threshold, wherein
    in response that only a two-step random access is supported by the uplink bandwidth part of the terminal device, the determining whether to report the random access problem according to the relationship between the number of random access request transmissions and the random access attempt threshold, comprises:
    determining whether to report the random access problem according to a relationship between the number of random access request transmissions and a first attempt threshold,
    wherein, the determining whether to report the random access problem according to the relationship between the number of random access request transmissions and the first attempt threshold, comprises:
    determining not to report the random access problem in response that the number of random access request transmissions reaches the first attempt threshold and the number of random access request transmissions does not reach a random access problem reporting threshold; and
    determining to report the random access problem in response that the number of random access request transmissions reaches the first attempt threshold and the number of random access request transmissions reaches the random access problem reporting threshold, wherein the random access problem reporting threshold is greater than the first attempt threshold.

2. The method according to claim 1, wherein, the determining whether to report the random access problem according to the relationship between the number of random access request transmissions and the first attempt threshold, comprises:
  determining to report the random access problem in response that the number of random access request transmissions reaches the first attempt threshold; and
  determining not to report the random access problem in response that the number of random access request transmissions does not reach the first attempt threshold.

3. The method according to claim 2, wherein
  the first attempt threshold is greater than a second attempt threshold, and
  the second attempt threshold is used by the terminal device to determine whether to fall back to the four-step random access from the two-step random access in a case where the two-step random access and the four-step random access are configured in the uplink bandwidth part of the terminal device.

4. The method according to claim 1, wherein
  the first attempt threshold is equal to a second attempt threshold, and
  the second attempt threshold is used by the terminal device to determine whether to fall back to the four-step random access from the two-step random access in a case where the two-step random access and the four-step random access are configured in the uplink bandwidth part of the terminal device.

5. The method according to claim 1, wherein the random access problem reporting threshold is configured by a network device.

6. The method according to claim 1, wherein, the determining whether to report the random access problem according to the relationship between the number of random access request transmissions and the first attempt threshold, comprises:
  determining not to report the random access problem in response that the number of random access request transmissions reaches the first attempt threshold and a problem reporting timer does not expire; and
  determining to report the random access problem in response that the number of random access request transmissions reaches the first attempt threshold and the problem reporting timer expires.

7. The method according to claim 6, wherein a starting occasion of the problem reporting timer comprises:
  a time when the random access request is sent for the first time; or
  a time when the number of random access request transmissions reaches the first attempt threshold.

8. The method according to claim 6, wherein a duration of the problem reporting timer is configured by a network device.

9. The method according to claim 1, wherein the first attempt threshold is configured by a network device.

10. The method according to claim 1, wherein
  in response that both a two-step random access and a four-step random access are supported by the uplink bandwidth part of the terminal device, the determining whether to report the random access problem according to the relationship between the number of random access request transmissions and the random access attempt threshold, comprises:
  determining whether to report the random access problem according to a relationship between the number of random access request transmissions and a third attempt threshold.

11. The method according to claim 10, wherein, the determining whether to report the random access problem according to the relationship between the number of random access request transmissions and the third attempt threshold, comprises:
  determining to report the random access problem in response that the number of random access request transmissions reaches the third attempt threshold; and
  determining not to report the random access problem in response that the number of random access request transmissions does not reach the third attempt threshold.

12. The method according to claim 10, further comprising:
  falling back, by the terminal device, from a two-step random access procedure to a four-step random access procedure, in response that the random access request sent by the terminal device is a message A, the number of random access request transmissions reaches the second attempt threshold, and a random access failure occurs.

13. A terminal device, comprising a processor and a memory for storing a computer program that is capable of running on the processor, wherein the processor is configured to perform, when running the computer program, steps of a random access problem reporting method, wherein:
  the random access problem reporting method comprises:
  determining, by the terminal device, a random access attempt threshold according to a random access type supported by an uplink bandwidth part; and
  in response to a random access failure of the terminal device, determining, by the terminal device, whether to report a random access problem, according to a relationship between the number of random access request transmissions and the random access attempt threshold, wherein
  in response that only a two-step random access is supported by the uplink bandwidth part of the terminal device, the determining whether to report the random access problem according to the relationship between the number of random access request transmissions and the random access attempt threshold, comprises:
  determining whether to report the random access problem according to a relationship between the number of random access request transmissions and a first attempt threshold,
  wherein, the determining whether to report the random access problem according to the relationship between the number of random access request transmissions and the first attempt threshold, comprises:
  determining not to report the random access problem in response that the number of random access request transmissions reaches the first attempt threshold and the number of random access request transmissions does not reach a random access problem reporting threshold; and
  determining to report the random access problem in response that the number of random access request transmissions reaches the first attempt threshold and the number of random access request transmissions reaches the random access problem reporting threshold, wherein the random access problem reporting threshold is greater than the first attempt threshold.

14. The terminal device according to claim 13, wherein, the determining whether to report the random access problem according to the relationship between the number of random access request transmissions and the first attempt threshold, comprises:
  determining to report the random access problem in response that the number of random access request transmissions reaches the first attempt threshold; and
  determining not to report the random access problem in response that the number of random access request transmissions does not reach the first attempt threshold.

15. The terminal device according to claim 14, wherein the first attempt threshold is greater than a second attempt threshold, and
  the second attempt threshold is used by the terminal device to determine whether to fall back to the four-step random access from the two-step random access in a case where the two-step random access and the four-step random access are configured in the uplink bandwidth part of the terminal device.

16. The terminal device according to claim 13, wherein, the determining whether to report the random access problem according to the relationship between the number of random access request transmissions and the first attempt threshold, comprises:
  determining not to report the random access problem in response that the number of random access request transmissions reaches the first attempt threshold and a problem reporting timer does not expire; and
  determining to report the random access problem in response that the number of random access request transmissions reaches the first attempt threshold and the problem reporting timer expires.

* * * * *